Nov. 10, 1959  G. T. JONES  2,912,072
BRAKE EQUALIZING SYSTEM
Filed Nov. 13, 1956
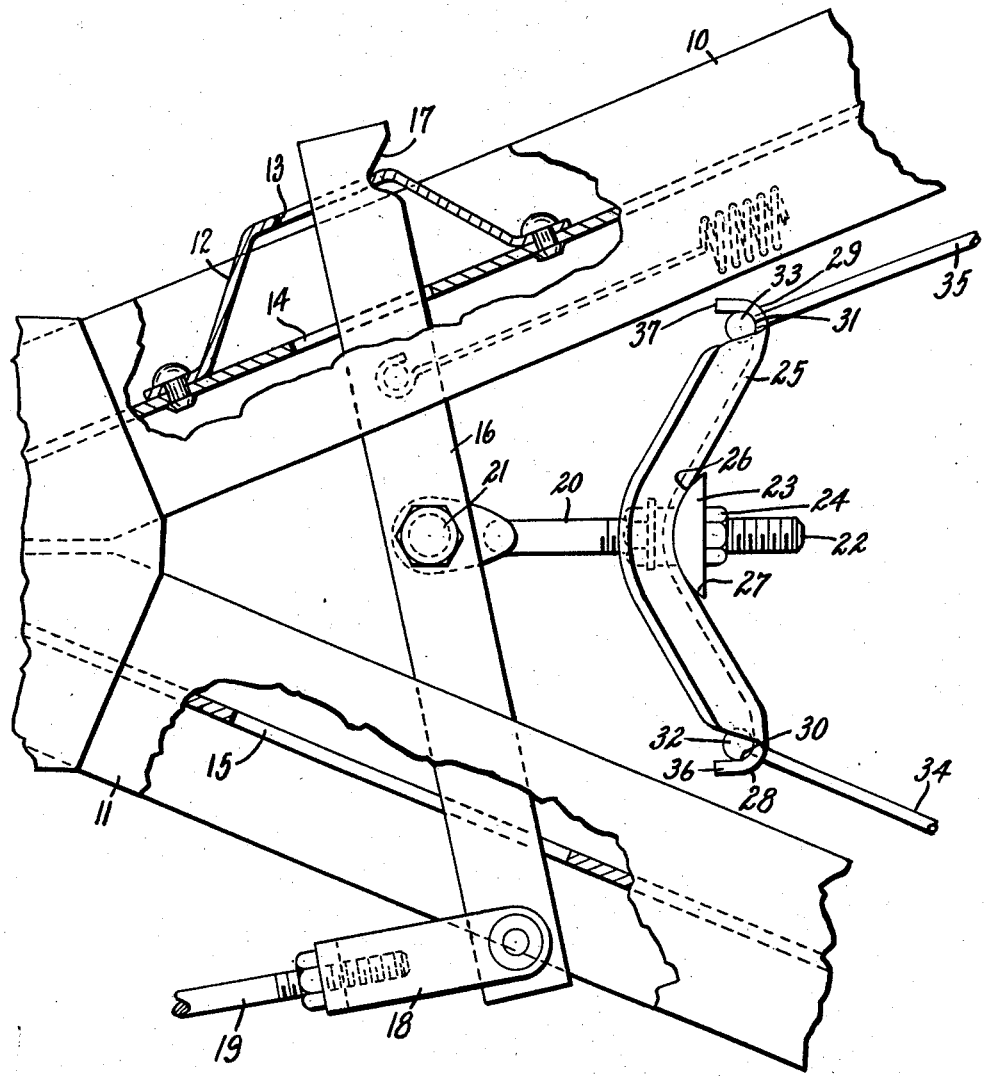
INVENTOR.
GEORGE T. JONES
BY D. C. Staley
HIS ATTORNEY

2,912,072
BRAKE EQUALIZING SYSTEM

George T. Jones, Lansing, Mich., assignor to General Motors Corporation, Detroit, Mich., a corporation of Delaware Application November 13, 1956, Serial No. 621,781

2 Claims. (Cl. 188—204)

This invention relates to a brake control system for a vehicle and particularly to an equalizing system for the brakes.

It is the common expedient on passenger vehicles to provide one brake system for the foot actuated brakes and a second emergency or parking brake system operated from a hand actuated lever. It is important that the parking or emergency brake system provide a uniform braking action on the several brakes of the vehicle to prevent skidding when the emergency system is applied. With the emergency braking system being a mechanical system as distinguished from the hydraulic system that is conventionally used with the foot operated brakes, it is essential that an equalizing mechanism be provided in the mechanical brake system.

Many arrangements of mechanical equalizing systems have heretofore been provided, but they have not been wholly satisfactory because of various limitations which tend to affect the equalization characteristics of the system after they have been driven for a long period of time with resultant accumulation of dirt and rust. In the mechanical equalizing system of this invention there is provided a minimum number of pivot connections that can wear or become stiff because of dirt and rust accumulation thereby providing for a more uniform action of the equalizing system for the brakes.

Further objects and advantages of the present invention will be apparent from the following description, reference being had to the accompanying drawings wherein a preferred form of the invention is clearly shown.

The mechanical equalizing system for mechanically actuating brakes of a motor vehicle is illustrated in this invention as being supported on the frame members 10 and 11 that form a part of the chassis frame of the vehicle. The frame member 10 supports a bracket 12 that has an opening 13 therein. The frame 10 has an opening 14 in its center web and the frame member 11 has a center opening 15 in its center web.

A lever 16 has a notch 17 in one end thereof that rides on the edge of the opening 13 in the bracket 12, the lever 16 extending through the openings 14 and 15 in the frame members 10 and 11. The engagement of the notch 17 with the edge of the opening 13 in the bracket 12 forms a pivot for the lever 16.

The opposite end of the lever 16 supports a clevis 18 to which there is attached a brake actuating cable 19 that extends into engagement with a hand operated lever mounted within the passenger compartment of the vehicle for actuation of the lever 16 when the hand operated lever is moved by the operator of the vehicle to pull the cable 19 in a left hand direction as viewed in the drawing.

The lever 16 supports a link 20 on a pivot bolt 21 that extends through the lever and the link 20. The link 20 is in the form of a rod having the left hand end flattened to receive the pivot bolt 21 and the right hand end provided with threads 22.

A pivot block 23 is slidable over the threads 22 on the link 20 and is prevented from removal from the right hand end of the rod by means of the retaining nut 24 which also provides for adjusting the position of the pivot block 23 on the link 20.

An equalizing arm 25 is slidable onto the rod link 20 and is shaped in the general form of a V with the apex of the V forming a semi-cylindrical surface 26 that forms a socket to engage the semi-cylindrical surface 27 on the pivot block 23. Thus the equalizing bar 25 is free for pivotal movement transversely of the link 20, and since the equalizing bar 25 and the pivot block 23 have unthreaded openings therein through which the rod 20 extends, these members are both free for rotation on the link rod 20 so that a substantially universal joint connection is provided between the link 20 and the equalizer bar 25.

Each of opposite ends 28 and 29 of the equalizer bar 25 are provided with sockets 30 and 31 respectively that receive the ball swivel connections 32 and 33 that are provided on the ends of brake operating cables 34 and 35 that extend into engagement with suitable brake operating mechanisms at each of the wheels on opposite sides of the vehicle. The ends 28 and 29 of the equalizer bar 25 have the slots 36 and 37 therein that provide for insertion of the brake cables into the ends of the equalizer bar so that the swivel balls 32 and 33 can seat in the sockets 30 and 31.

While the form of embodiment of the invention as herein disclosed constitutes a preferred form, it is to be understood that other forms might be adopted as may come within the scope of the claims which follow.

What is claimed is as follows.

1. In a brake control system, support means, a lever pivotally carried at one end on said support means, an operating cable attached to the opposite end of said lever to actuate the same, a link member pivotally carried at one end on said lever between the ends of the lever for pivoting in the same plane as said lever, a pivot block rotatively mounted at the opposite end of said link for adapting a semi-cylindrical surface on said pivot block for pivoting an equalizer bar in the same plane as said link member, screw means at said opposite end of said link for adjusting the effective length of said link, an equalizer bar on said link having a semi-cylindrical surface at the longitudinal center of said bar forming a socket receiving said semi-cylindrical surface of said pivot block to pivot said bar on said block at the longitudinal center of the bar with freedom of pivotal motion transversely of said link, and a brake operating cable attached at each of opposite ends of said bar.

2. In a brake control system, support means, a lever pivotally carried at one end on said support means, an operating cable attached to the opposite end of said lever to actuate the same, a link member pivotally carried at one end for transverse pivotal movement on said lever between the ends of the lever, a pivot block at the opposite end of said link having a semi-cylindrical surface for pivoting an equalizer bar, a generally V-shaped equalizer bar on said link with the apex of the V forming a semi-cylindrical socket receiving the mating surface of said pivot block to pivot said bar on said block at the longitudinal center of the bar with freedom of pivotal motion transversely of said link, each of opposite ends of said bar having a socket, and a brake operating cable having a ball connection on the end thereof attached at each of opposite ends of said bar with the respective ball connections of the said cables in the respective sockets.

References Cited in the file of this patent
UNITED STATES PATENTS

| | | |
|---|---|---|
| 1,532,644 | Bastien | Apr. 7, 1925 |
| 1,598,174 | Tarlton et al. | Aug. 31, 1926 |
| 2,063,729 | Dykstra | Dec. 8, 1936 |
| 2,074,716 | Axtmann | Mar. 23, 1937 |
| 2,845,812 | Pobar | Aug. 5, 1958 |